United States Patent
Casset

(10) Patent No.: US 7,558,046 B2
(45) Date of Patent: Jul. 7, 2009

(54) VARIABLE-CAPACITANCE ELECTROMECHANICAL MICRO-CAPACITOR AND METHOD FOR PRODUCING SUCH A MICRO-CAPACITOR

(75) Inventor: Fabrice Casset, Tencin (FR)

(73) Assignee: Commissariat a l'Energie Atomique, Paris (FR)

( * ) Notice: Subject to any disclaimer, the term of this patent is extended or adjusted under 35 U.S.C. 154(b) by 394 days.

(21) Appl. No.: 11/391,555

(22) Filed: Mar. 29, 2006

(65) Prior Publication Data

US 2006/0238956 A1 Oct. 26, 2006

(30) Foreign Application Priority Data

Apr. 25, 2005 (FR) ................... 05 04105

(51) Int. Cl.
*H01G 5/00* (2006.01)
*H01G 7/00* (2006.01)

(52) U.S. Cl. ...................... 361/277; 361/303

(58) Field of Classification Search ............... 361/277, 361/303, 304–305
See application file for complete search history.

(56) References Cited

U.S. PATENT DOCUMENTS

| | | | |
|---|---|---|---|
| 6,066,536 A | 5/2000 | Lin | |
| 6,496,351 B2 * | 12/2002 | Hill et al. ............. | 361/278 |
| 6,625,004 B1 | 9/2003 | Musolf et al. | |
| 2002/0080554 A1 | 6/2002 | Chua et al. | |
| 2004/0257745 A1 | 12/2004 | Robert | |

FOREIGN PATENT DOCUMENTS

WO WO 2005/001863 A1 1/2005

OTHER PUBLICATIONS

Gray et al; "Electrostatic Actuators and Tunable Micro Capacitors/Switches with Expanded Tuning Range Due to Intrinsic Stress Gradients"; Proceeding of the SPIE; vol. 4981; 2003; pp. 202-213; XP-002338948.
Peroulis et al; "Highly Reliable Analog MEMS Varactors"; Microwave Symposium Digest; 2004; pp. 869-872; XP010728259.
Oz et al; "RF CMOS-MEM Capacitor Having Large Tuning Range"; Transducers, Solid-State Sensors, Actuators, and Microsystems; 2003; pp. 851-854; xp010646841.

* cited by examiner

*Primary Examiner*—Eric Thomas
(74) *Attorney, Agent, or Firm*—Oliff & Berridge, PLC

(57) ABSTRACT

A first electrode is integral to a beam having two ends securely affixed to a support fixed onto a substrate. Residual stresses cause buckling of the beam so that the arch of the beam is close to at least one second electrode. The support can be formed by a ring fixed to the substrate by means of two fixing bases arranged on each side of the ring on a fixing axis passing through the centre of the ring, the beam being arranged on a diameter of the ring perpendicular to the fixing axis. The ring comprises at least one layer tensile stressed along the fixing axis. The beam can comprise at least one layer stressed in compression along a longitudinal axis of the beam. The second electrode can be integral to an additional support, the beam being arranged between the substrate and the second electrode.

16 Claims, 5 Drawing Sheets

VARIABLE-CAPACITANCE ELECTROMECHANICAL MICRO-CAPACITOR AND METHOD FOR PRODUCING SUCH A MICRO-CAPACITOR

BACKGROUND OF THE INVENTION

The invention relates to an electromechanical micro-capacitor having a variable capacitance according to an electrical actuating voltage and comprising at least first and second electrodes, the first electrode being integral to a beam having two ends securedly affixed to a support fixed onto a substrate.

STATE OF THE ART

Certain variable-capacitance electromechanical micro-capacitors have an operation based on variation of the separating distance between the two electrodes of the condenser. Thus, the capacitance of the capacitor is for example controlled by actuation of one of the electrodes enabling the latter to be moved closer to or farther away from the other electrode. Actuation is typically performed by an electrostatic actuator. In the case of certain types of micro-capacitors, the electrostatic forces between the electrodes cause a sudden sticking, which limits the capacitance variation range to a variation of 50%.

The document FR 2831705-A1 describes a variable-capacitance electro-mechanical micro-capacitor comprising a first electrode integral to a suspended beam, or forming the suspended beam, having two ends securedly affixed to a support fixed onto a substrate. A second electrode is arranged on the substrate. Actuating electrodes attached to the central part of the beam enable the central part of the beam to be attracted in the direction of the substrate, and therefore in the direction of the second electrode, depending on an electrical actuating voltage. An insulating layer enables electrical contact between the first and second electrodes to be avoided. By applying, in addition, an electrical voltage between the first and second electrodes, the sticking zone between the first electrode and the second electrode is extended, which enables the capacitance of the capacitor to be increased. This capacitor does however require the use of two electrical voltages. Moreover, it is difficult to control actuation of the beam in such a way that only the central part of the beam is close to the second electrode.

OBJECT OF THE INVENTION

It is an object of the invention to remedy these shortcomings and in particular to provide a variable-capacitance electromechanical micro-capacitor operating at low electrical actuating voltage and presenting a stable capacitance and a wide capacitance variation range.

According to the invention, this object is achieved by the fact that residual stresses cause buckling of the beam so that the arch of the beam is close to the second electrode.

According to a preferred embodiment the invention, the beam comprises an insulating layer arranged facing the second electrode. The arch of the beam can then be in contact with the second electrode.

According to a particular embodiment of the invention, the support is formed by a ring fixed to the substrate by means of two fixing bases arranged on each side of the ring, the beam being arranged on a diameter of the ring perpendicular to the fixing axis, the ring comprising at least one layer tensile stressed along the fixing axis.

According to a development of the invention, the beam comprises at least one layer stressed in compression along a longitudinal axis of the beam.

The second electrode can in particular be integral to an additional support, the beam being arranged between the substrate and the second electrode.

Two second electrodes are preferably arranged facing the beam, along an axis parallel to the longitudinal axis of the beam, respectively on each side of the arch of the beam.

According to a first particular embodiment of the actuating means, the first and second electrodes constitute electrical actuating means, the electrical actuating voltage being designed to be applied between the first and second electrodes.

According to a second particular embodiment of the actuating means, the micro-capacitor comprises electrical actuating means comprising at least one additional electrode integral to the beam, the electrical actuating voltage being designed to be applied between the additional electrode and the second electrode.

Two additional electrodes integral to the beam can in particular be arranged on each side of a longitudinal axis of the beam.

According to a third particular embodiment of the actuating means, the micro-capacitor comprises electrical actuating means comprising at least one additional electrode integral to the additional support, the electrical actuating voltage being designed to be applied between the additional electrode and the first electrode.

Two additional electrodes integral to the beam can in particular be arranged on each side of a longitudinal axis of the additional support.

It is a further object of the invention to provide a method for producing a micro-capacitor according to the invention, comprising stressed deposition of at least one of the elements chosen from the beam and the support so that residual stresses cause buckling of the beam.

According to a particular embodiment of the method of the invention, the method comprises fabrication of the beam and the ring in a single stacking of layers on a sacrificial layer, so that, after the sacrificial layer has been removed, the ring is tensile stressed along the fixing axis.

According to another particular embodiment of the method of the invention, the method comprises fabrication of the beam, on an assembly formed by a sacrificial layer and the support, by deposition of at least one layer stressed in compression along a longitudinal axis of the beam.

BRIEF DESCRIPTION OF THE DRAWINGS

Other advantages and features of the invention will become more clearly apparent from the following description of particular embodiments of the invention given as non-restrictive examples only and represented in the accompanying drawings in which.

DESCRIPTION OF PARTICULAR EMBODIMENTS

Figure 1:
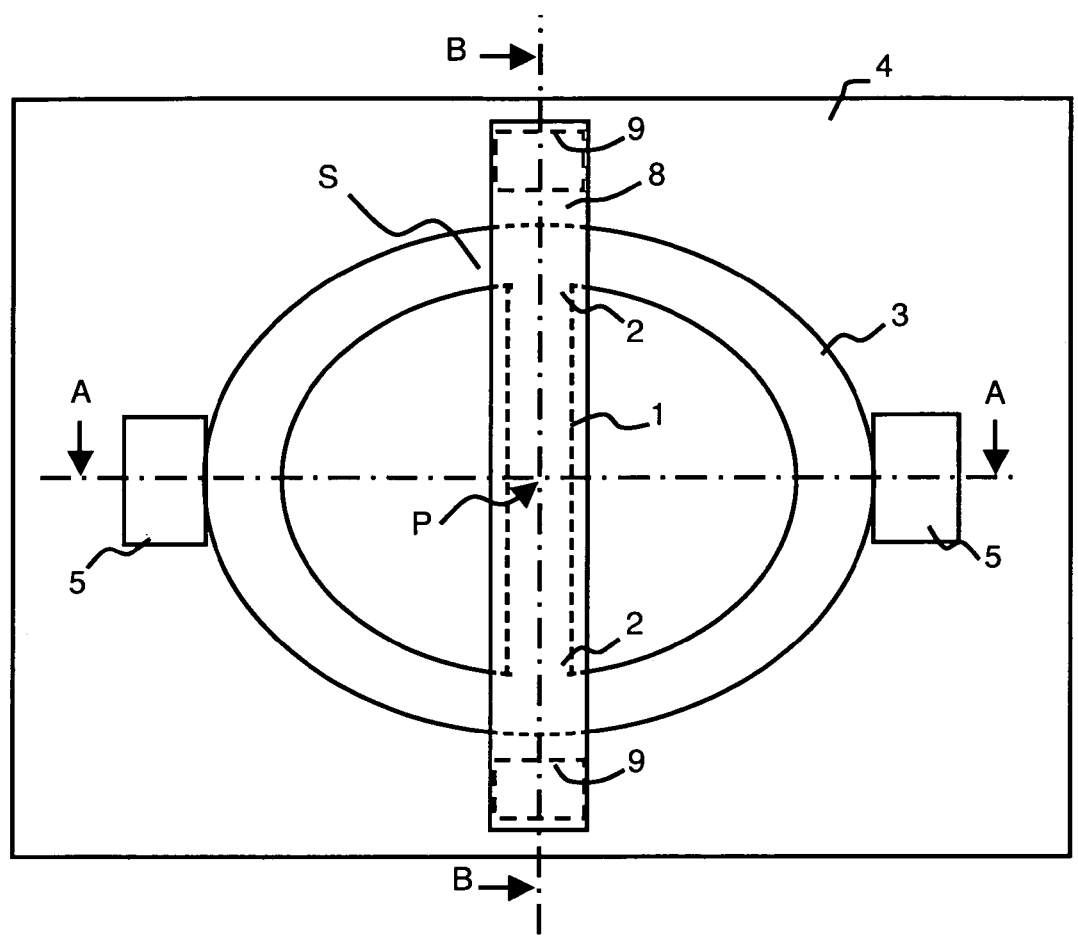
FIG. 1 represents a particular embodiment of a micro-capacitor according to the invention, in top view.
Figure 2:
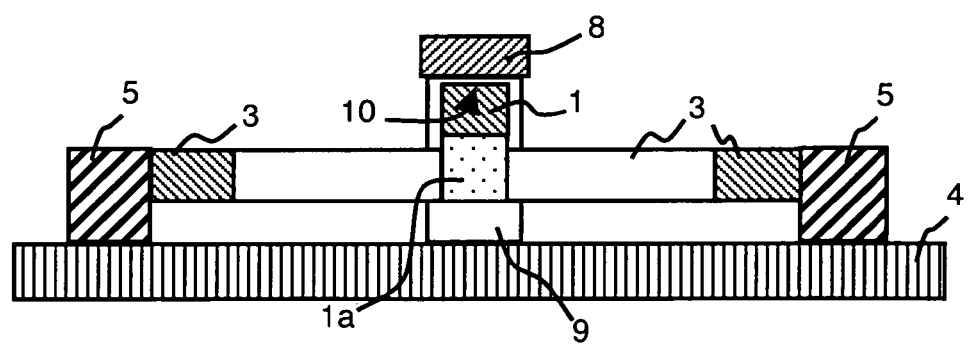
FIGS. 2 and 3 represent the micro-capacitor according to FIG. 1 respectively in cross-section along the axis A-A and along the axis B-B.
Figure 3:
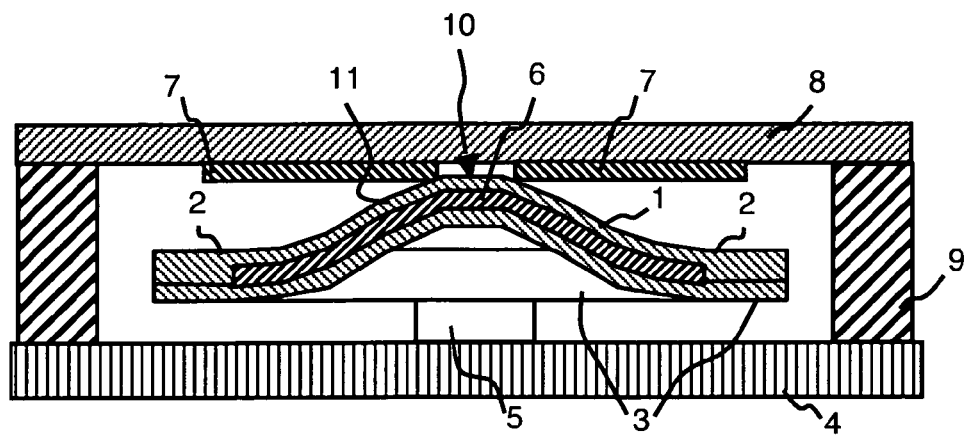

The variable-capacitance electromechanical micro-capacitor represented in FIGS. 1 to 3 comprises a beam 1 having two ends 2 securely affixed to a ring 3 fixed to a substrate 4 by means of two fixing bases 5. The ring 3 thus constitutes a support S for the beam 1. The fixing bases 5 are arranged on each side of the ring 3, on a fixing axis A-A passing through the centre P of the ring 3. The beam 1 is arranged on a diameter of the ring 3 perpendicular to the fixing axis A-A defined by the fixing bases 5. In FIG. 1, the beam 1 is arranged along an axis B-B.

In FIG. 3, the micro-capacitor comprises a first electrode 6 integral to the beam 1 and two second electrodes 7, not represented in FIGS. 1 and 2 for the sake of clarity. In FIG. 2, a dotted surface 1a represents a bottom face of the beam 1.

In the particular embodiment represented in FIGS. 1 to 3, the micro-capacitor comprises an additional support 8 attached to the substrate 4 by means of two additional bases 9. In FIG. 3, the second electrodes 7 are integral to the additional support 8 and the beam 1 is arranged between the substrate 4 and the second electrodes 7.

Residual stresses due to fixing of the ring 3 onto the substrate 4 cause buckling of the beam 1 so that the arch 10 of the beam 1 is close to the second electrodes 7. In particular, the top part of the arch 10 is close to the second electrodes 7. Buckling takes place in particular when the ring 3 is formed by at least one layer tensile stressed along the fixing axis A-A or when it comprises at least one such layer. The tensile stress of the ring 3 along the fixing axis A-A causes shrinkage of the ring 3 in the direction of the diameter of the ring 3 perpendicular to the fixing axis A-A, and then results in a compression stress of the beam 1 along its longitudinal axis.

As represented in FIG. 3, the beam 1 preferably comprises a top insulating layer 11 arranged facing the second electrodes 7. Thus, the arch 10 of the beam 1 can be in contact with the second electrode 7 without creating an electrical contact between the first electrode 6 and the second electrodes 7. In another embodiment, an insulating layer can be deposited on the second electrodes 7, facing the first electrode 6.

Figure 4:
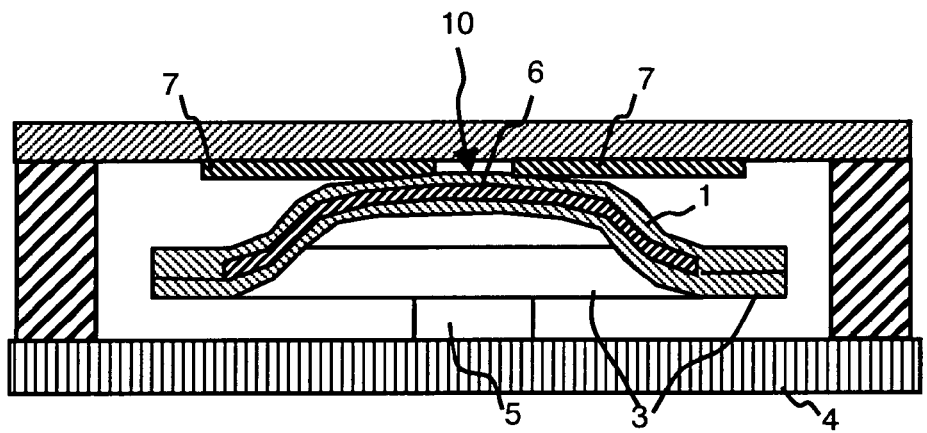
FIG. 4 illustrates operation of the micro-capacitor according to FIG. 1, in cross-section along the axis B-B.

FIG. 3 represents the micro-capacitor in a rest position, i.e. when the actuating voltage is zero. The micro-capacitor according to the invention enables the beam 1 to be attracted further in the direction of the second electrode, according to an actuating voltage. Thus, by increasing the actuating voltage, an increasingly large part of the first electrode 6 approaches the second electrode 7, as represented in FIG. 4, and the capacitance of the capacitor is greatly increased.

The micro-capacitor presents the advantage that, in the rest position thereof (FIG. 3), a central part of the first electrode 6 is automatically close to the second electrodes 7, and the electrostatic forces are therefore locally high, even when a weak electrical voltage is applied. These local electrostatic forces notably enable the attraction between the electrodes to be made to propagate closer and closer along the electrodes 6 and 7 thus enabling the contact zone between the beam 1 and the second electrodes 7 to be enlarged.

In FIG. 3, the two second electrodes 7 are arranged facing the beam 1, along an axis parallel to the longitudinal axis of the beam 1, respectively on each side of the arch 10 of the beam 1. Thus, the second electrodes 7 are not arranged facing the arch 10 itself, which enables the capacitance of the capacitor to be reduced in the rest position of the beam 1, thus enabling the capacitance variation range to be extended.

Figure 5:
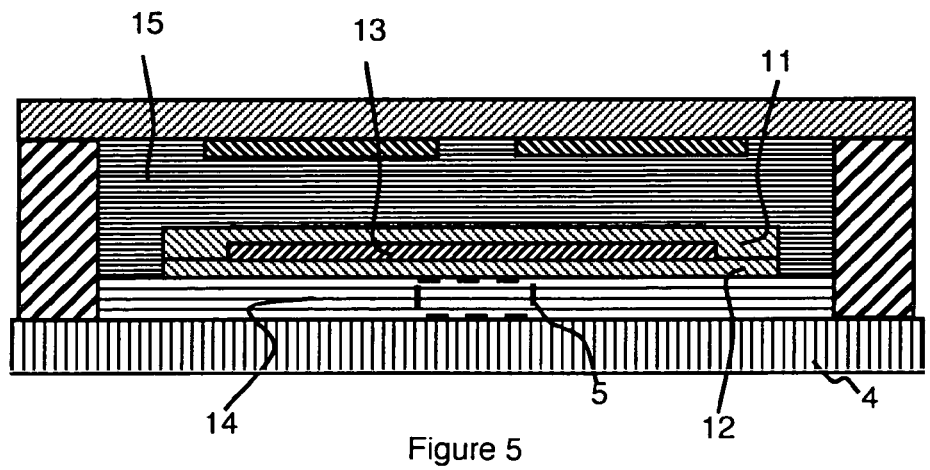
FIG. 5 represents a step of a particular embodiment of a method for producing a micro-capacitor according to FIG. 1, in cross-section along the axis B-B.

A method for producing the micro-capacitor according to the invention comprises stressed deposition of the beam 1 and/or of the support S of the beam, in such a way that residual stresses cause buckling of the beam 1. For example, the beam 1 and the ring 3 can be achieved in a single stacking of layers on a first sacrificial layer 14, as represented in FIG. 5. Said stacking comprises a bottom insulating layer 12, a conducting layer 13 forming the first electrode 6 and the top insulating layer 11. The conducting layer 13 can be limited to the part of the stacking corresponding to the beam 1, as represented in FIG. 5. Thus, the ring 3 is constituted by the bottom insulating layer 12 and the top insulating layer 11 only.

In the particular embodiment represented in FIG. 5, deposition of the bottom insulating layer 12 is performed on the first sacrificial layer 14. A second sacrificial layer 15 enables the additional support 8 to be achieved.

The stacking constituting the beam 1 and the ring 3 is deposited in such a way that, after the first and second sacrificial layers 14 and 15 have been removed, the stacking is tensile stressed along the fixing axis A-A. The tensile stress of the ring 3 thus causes stretching of the ring along the fixing axis A-A thus causing buckling of the beam 1 along its longitudinal axis.

Figure 6:
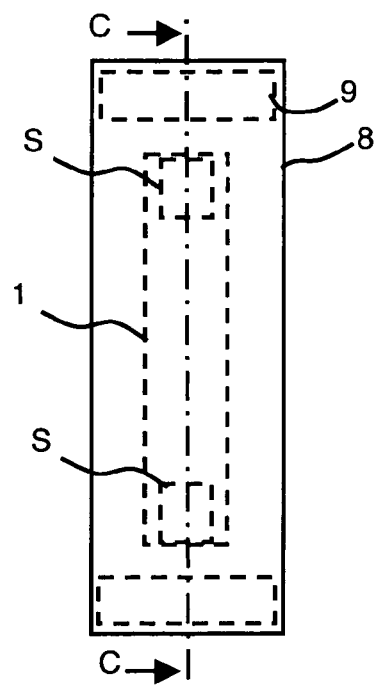
FIG. 6 represents a top view of another particular embodiment of a micro-capacitor according to the invention.
Figure 7:
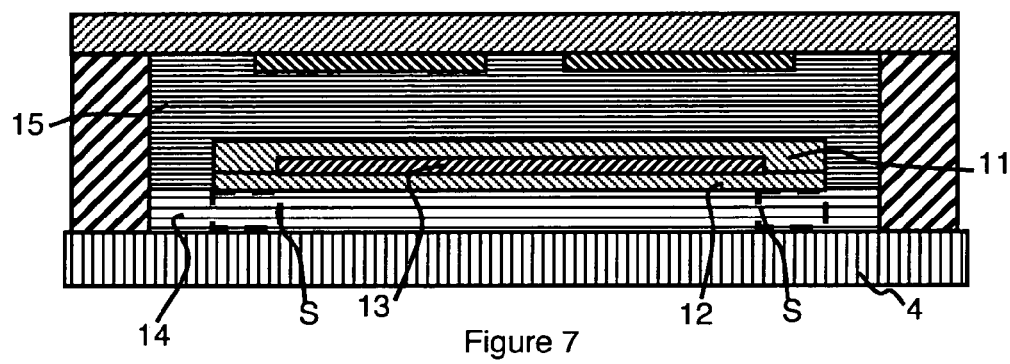
FIGS. 7 and 8 represent two steps of a particular embodiment of a method for producing a micro-capacitor according to FIG. 6, in cross-section along the axis C-C.
Figure 8:
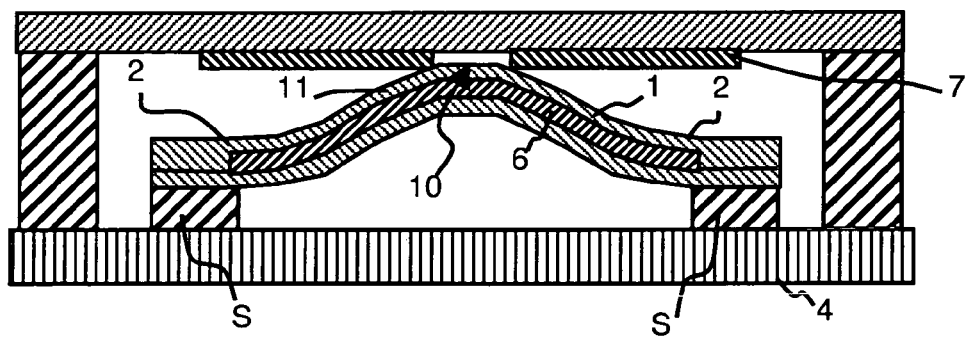

In another particular embodiment represented in FIGS. 6 to 8, the beam itself comprises at least one layer stressed in compression along a longitudinal axis C-C of the beam 1. The support S is simply formed by two fixing bases. As represented in FIG. 7, the beam 1 can be achieved by deposition on an assembly formed by a first sacrificial layer 14 and the two bases constituting the support S. Thus, residual stresses due to fixing of the beam 1 on the fixing bases S cause buckling of the beam 1 so that the arch 10 of the beam 1 is close to the second electrode 7, after the first sacrificial layer 14 has been removed, as represented in FIG. 8.

The residual stresses can be mastered by adjusting for example the thicknesses, dimensions, geometry and materials (Young's modulus, Poisson's ratio) of the deposited layers. Tensile stressed nitrided compounds are for example used having a thickness comprised between 0.5 and 1 micron for the ring 3. The tensile stress level necessary for the arch 10 of the beam 1 to be close to the second electrode 7 can be studied by finite element simulations by varying the stress values to calculate the buckling of the beam 1. The stress value for which the buckling presents an amplitude such that the beam 1 touches the second electrode 7 at a point is thus determined.

The above parameters can also be determined empirically by tests and/or the nitride deposition parameters can be adjusted, for example the deposition temperature or power. The first electrode 6, which is mobile, can be made of titanium nitride TiN or of gold. The thickness of the first electrode 6 is for example comprised between 0.3 and 0.4 microns.

The ring 3 has for example an internal diameter of 400 microns and an external diameter of 450 microns. The beam 1 therefore has a length of 400 microns and can for example have a width of 60 microns. The buckling is for example such that the arch 10 of the beam 1 is raised by 12 microns.

Actuation of the micro-capacitor can be performed by means of the first and second electrodes. Thus, the electrical actuating voltage is applied between the first electrode 6 and the second electrodes 7, i.e. the actuating voltage is identical to the voltage at the terminals of the micro-capacitor, the capacitance whereof thus varies according to the voltage applied to the terminals thereof.

For radiofrequency applications, it is advantageous to dissociate the micro-capacitor terminals and the actuating electrodes so as to separate the actuating zone from the active zone defining the variable capacitance value. A high-power radiofrequency signal superposed on the actuating voltage could in fact disturb operation of the micro-capacitor. In this case, additional electrodes can be used for actuation. Additional first and second electrodes can for example be used for electrostatic actuation and actuation of the first electrode 6 and second electrodes 7 of the micro-capacitor can be completely dissociated.

Figure 9:
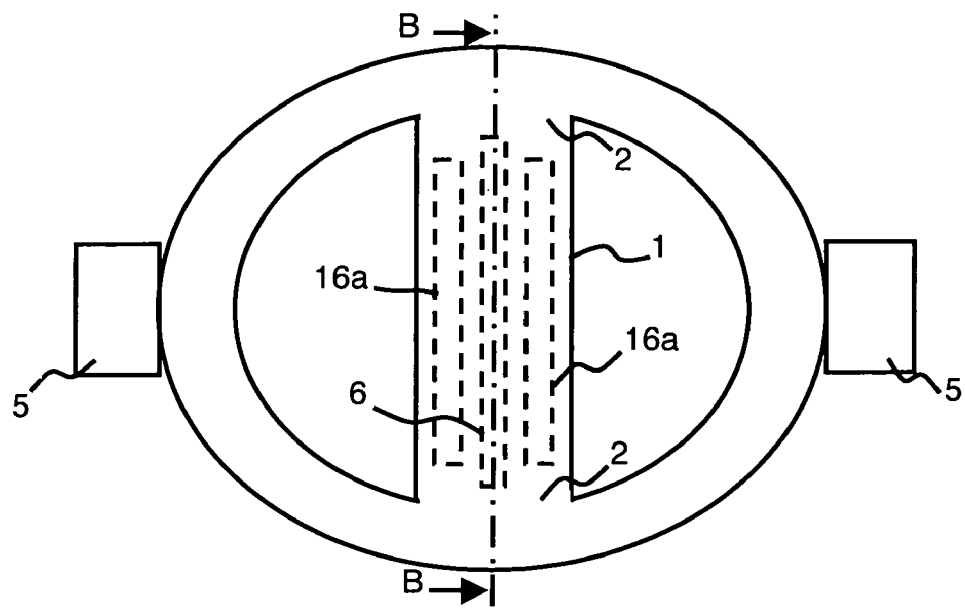
FIGS. 9 and 10 schematically illustrate two particular embodiments of additional electrodes of a micro-capacitor according to the invention, in top view.

It is also possible to use one of the first and second electrodes for actuation. For example, the micro-capacitor comprises at least one additional electrode 16a integral to the beam 1. The electrical actuating voltage is thus applied between the additional electrode 16a and the second electrodes 7. As represented in FIG. 9, two additional electrodes 16a integral to the beam 1 can be arranged on each side of the axis B-B which is the longitudinal axis of the beam 1. The width of the second electrodes 7 is adapted to the width of the assembly formed by the two additional electrodes 16a and the first electrode 6.

Figure 10:
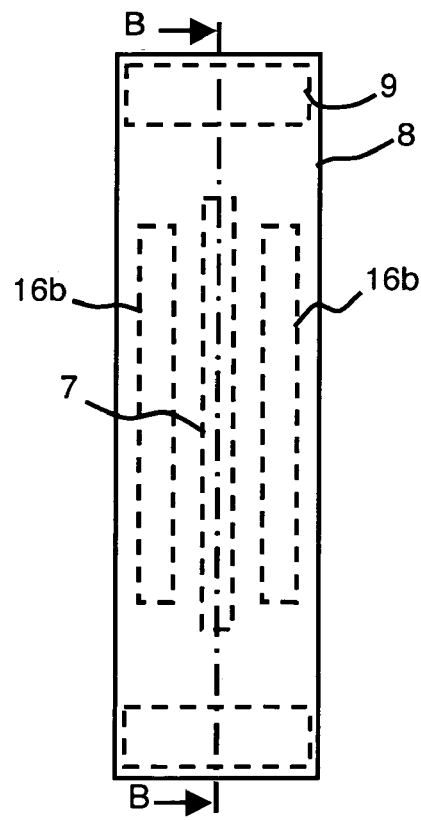

In another particular embodiment of actuation, the micro-capacitor comprises an additional electrode 16b integral to the additional support 8. The electrical actuating voltage is thus applied between the additional electrode 16b and the first electrode 6. As represented in FIG. 10, two additional electrodes 16b integral to the additional support 8 can for example be arranged on each side of a longitudinal axis of the additional support 8. The two additional electrodes 16b are thus arranged respectively on each side of the single second electrode 7 arranged on the axis B-B which corresponds to the longitudinal axis of the additional support 8 and of the beam 1. The width of the first electrode 6 is then adjusted to the width of the assembly formed by the two additional electrodes 16a and the second electrode 7.

Figure 11:
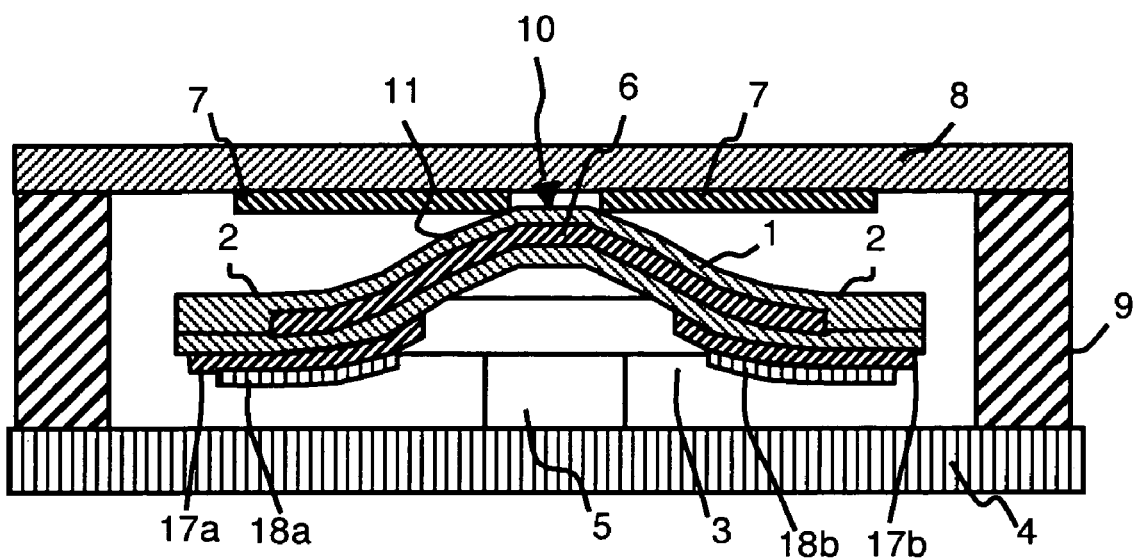
FIG. 11 represents an alternative embodiment of the micro-capacitor according to FIG. 1, in cross-section along the axis B-B.

In an alternative embodiment, the beam 1 of the micro-capacitor comprises a layer made from piezoelectric material (AlN, PZT, etc.) or from a material able to thermally dilate (Al, AlSi, Inconel™, etc.). In the particular embodiment illustrated in FIG. 11 in the rest position, this layer 17 forms two distinct zones 17a and 17b, at the bottom surface of the beam 1, respectively arranged at the longitudinal ends of the beam 1. An actuating electrode 18, for example made of Titanium (Ti), titanium nitride (TiN), platinum (Pt) or gold, covers at least a part of the layer 17. In FIG. 11, two actuating electrodes 18a and 18b partially cover respectively the zones 17a and 17b of the layer 17. Application of an actuating voltage between the electrodes 6 and 18 causes dilatation of the material, which is piezoelectric or able to deform thermally, of the layer 17. The dilatation of this material being greater than that of the materials (SiN, oxide, Si, etc.) constituting the structural layers of the beam, a bimetal effects occurs which causes a mechanical torque to appear, thus increasing the sticking zone.

The length of the layer 17 can be smaller than or equal to the length L of the beam. In a preferred embodiment, each zone 17a and 17b has a length substantially close to L/3. The width of the layer 17 is smaller than or equal to the width of the beam and its thickness is preferably comprised between 0.2 and 1 µm. This thickness can be adjusted according to the required displacement.

The invention is not limited to the embodiments represented. In particular, the number of first and second electrodes can be any number. For example, the micro-capacitor can comprise several first electrodes 6 and/or a single second electrode 7 or more than two second electrodes 7.

The invention claimed is:

1. Electromechanical micro-capacitor having a variable capacitance according to an electrical actuating voltage and comprising at least first and second electrodes, the first electrode being integral to a beam having two ends securely affixed to a support fixed onto a substrate, wherein residual stresses cause compression stresses leading to buckling of the beam so that the arch of the beam is close to the second electrode.

2. Micro-capacitor according to claim 1, wherein the beam comprises an insulating layer arranged facing the second electrode.

3. Micro-capacitor according to claim 2, wherein the arch of the beam is in contact with the second electrode.

4. Micro-capacitor according to claim 1, wherein the support is formed by a ring fixed to the substrate by means of two fixing bases arranged on each side of the ring on a fixing axis passing through the center of the ring, the beam being arranged on a diameter of the ring perpendicular to the fixing axis, the ring comprising at least one layer tensile stressed along the fixing axis.

5. Micro-capacitor according to claim 1, wherein the beam comprises at least one layer stressed in compression along a longitudinal axis of the beam.

6. Micro-capacitor according to claim 1, wherein the second electrode is integral to an additional support, the beam being arranged between the substrate and the second electrode.

7. Micro-capacitor according to claim 6, wherein two second electrodes are arranged facing the beam along an axis parallel to the longitudinal axis of the beam, respectively on each side of the arch of the beam.

8. Micro-capacitor according to claim 6, comprising electrical actuating means comprising at least one additional electrode integral to the additional support, the electrical actuating voltage being designed to be applied between the additional electrode and the first electrode.

9. Micro-capacitor according to claim 8, wherein two additional electrodes integral to the additional support are arranged on each side of a longitudinal axis of the additional support.

10. Micro-capacitor according to claim 1, wherein the first and second electrodes constitute electrical actuating means, the electrical actuating voltage being designed to be applied between the first and second electrodes.

11. Micro-capacitor according to claim 1, wherein the beam comprises a layer made of a material chosen from piezoelectric materials and thermally deformable materials and at least partially covered by an actuating electrode, the electrical actuating voltage being designed to be applied between the actuating electrode and the first electrode.

12. Micro-capacitor according to claim 1, comprising electrical actuating means comprising at least one additional electrode integral to the beam, the electrical actuating voltage being designed to be applied between the additional electrode and the second electrode.

13. Micro-capacitor according to claim 12, wherein two additional electrodes integral to the beam are arranged on each side of a longitudinal axis of the beam.

14. Method for producing an electromechanical micro-capacitor according to claim 1, comprising stressed deposition of at least one of the elements chosen from the beam and the support, so that residual stress cause buckling of the beam.

15. Method according to claim 14, comprising fabrication of the beam and ring in a single stacking of layers on a sacrificial layer, so that, after the sacrificial layer has been removed, the ring is tensile stressed along the fixing axis.

16. Method according to claim 14, comprising fabrication of the beam, on an assembly formed by a sacrificial layer and the support, by deposition of at least one layer stressed in compression along a longitudinal axis of the beam.

* * * * *